Nov. 15, 1927.
N. RANSOHOFF
1,649,731
BUILDING BLOCK MOLDING APPARATUS
Filed Feb. 5, 1926
3 Sheets-Sheet 2
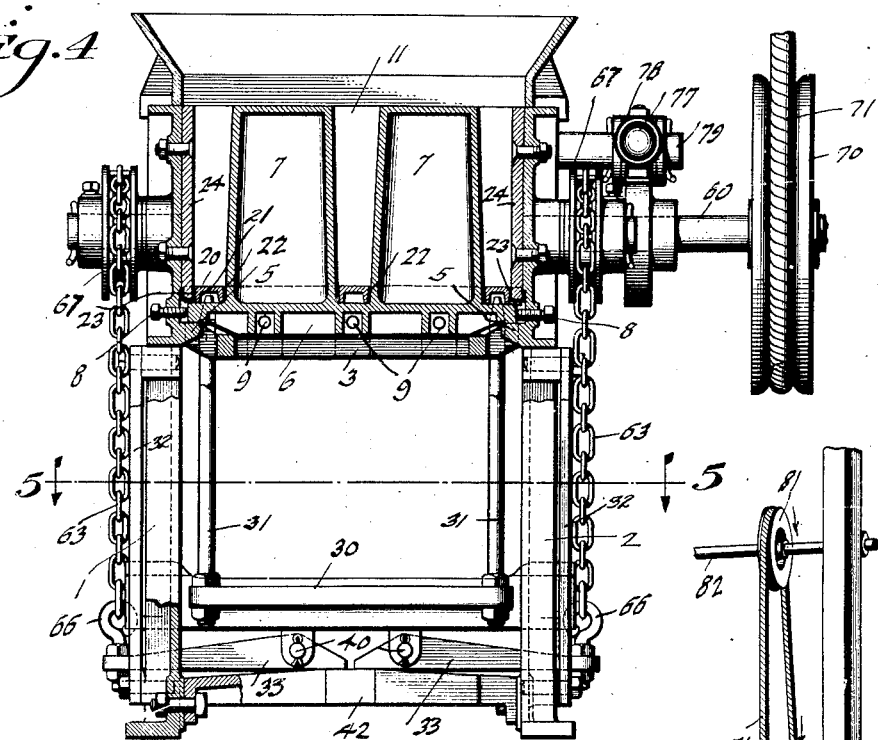
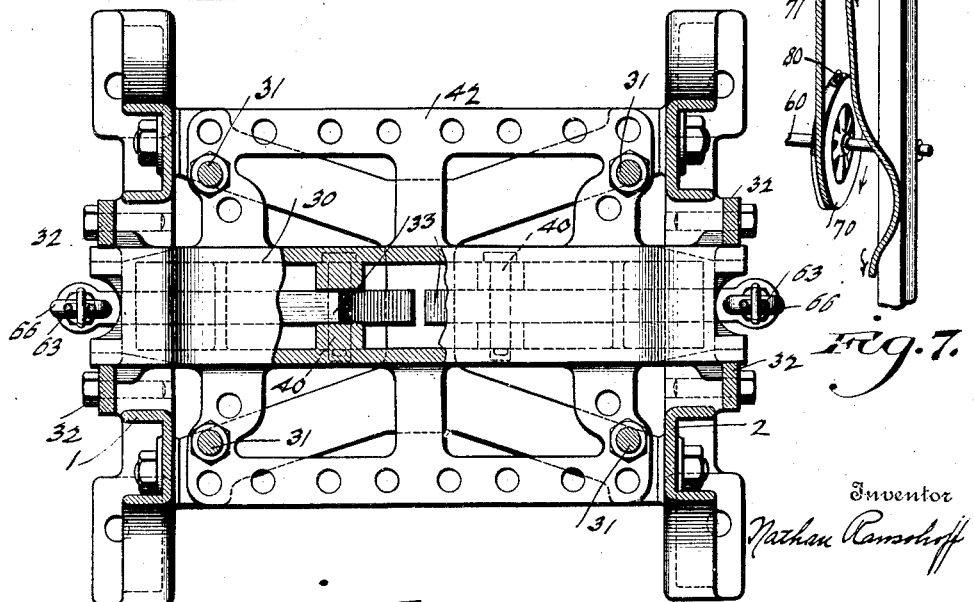
Inventor
Nathan Ransohoff
By
Wood & Wood
Attorneys

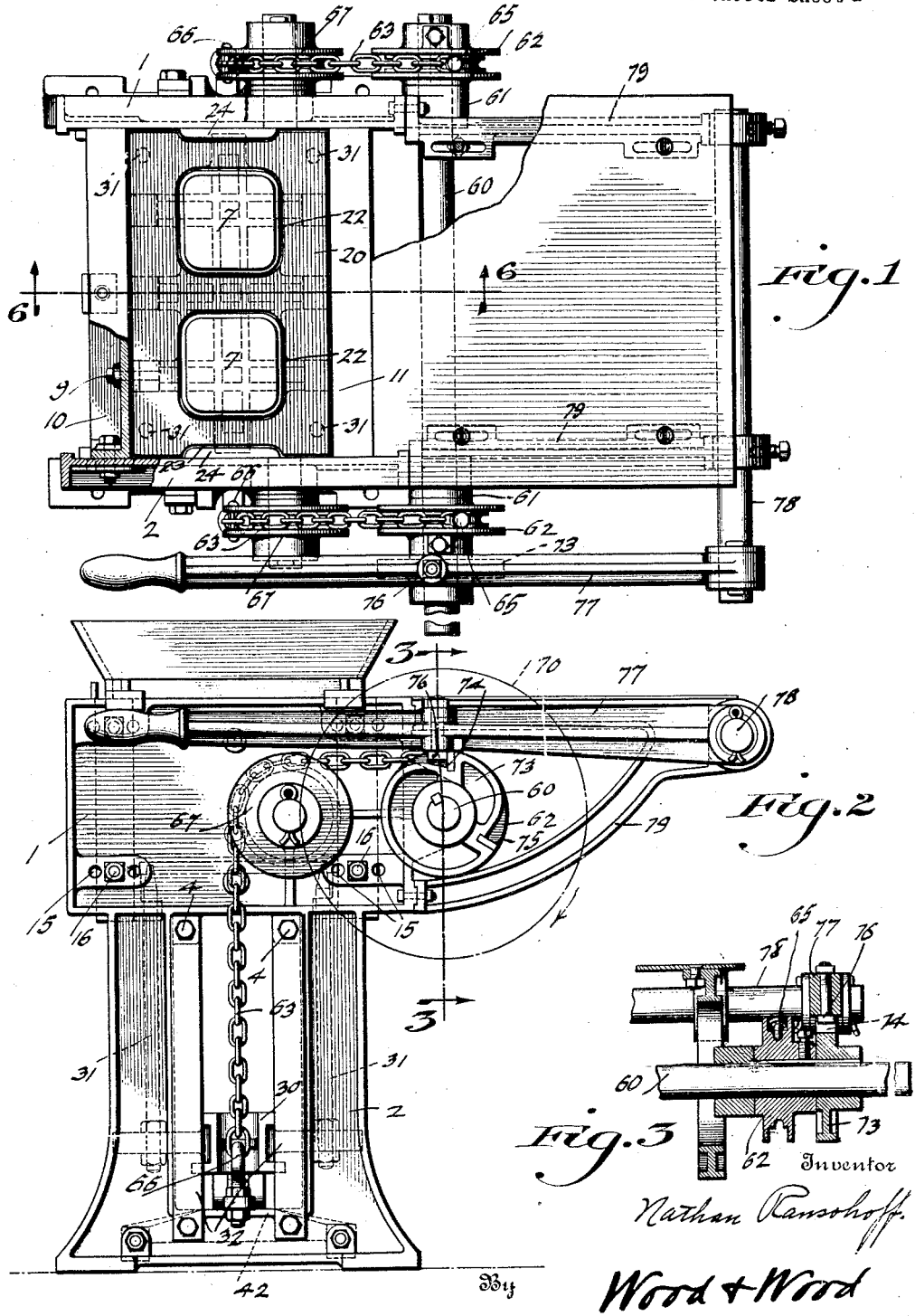

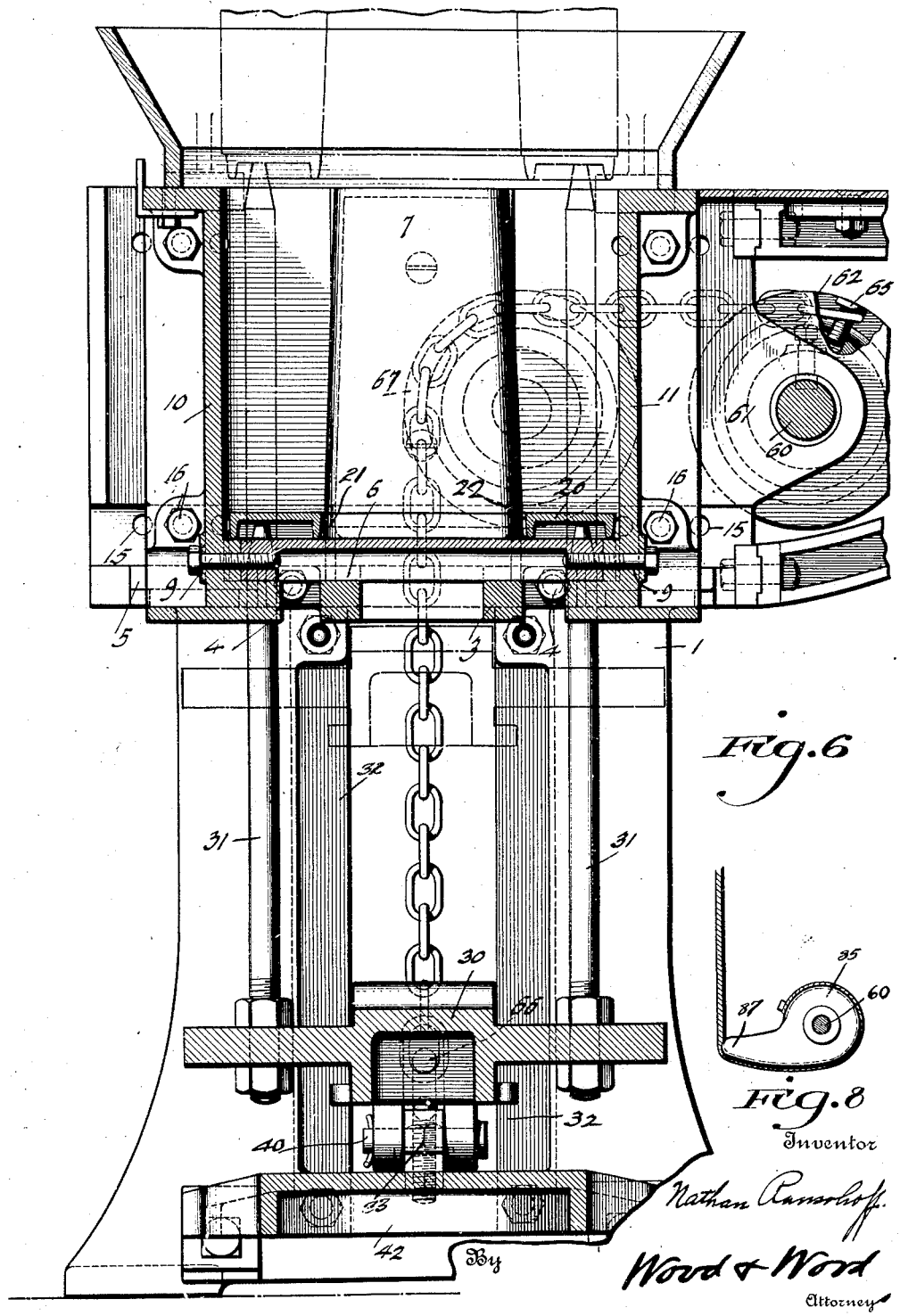

Patented Nov. 15, 1927.

1,649,731

UNITED STATES PATENT OFFICE.

NATHAN RANSOHOFF, OF CINCINNATI, OHIO.

BUILDING-BLOCK-MOLDING APPARATUS.

Application filed February 5, 1926. Serial No. 86,339.

This invention relates generally to improvements in molding machines, and particularly for making hollow cement building blocks, in which a loose pallet normally provides the base of the mold utilized in combination with power driven elevator means for ejecting the molded pallet from the mold.

An object of the invention is to provide a simplified and very compact ejector mechanism, certain parts of which do not come in contact with the cement, thus making for increased life of the mechanism.

Another object is to provide an ejector mechanism of such compact structure, as to permit the top of a superposed mold box to be disposed at a minimum level above the floor or ground, and at a height to facilitate the lifting off or removal of a discharged block.

One of the difficulties encountered, is to release the molded article from its compact with the walls of the mold initially in ejecting, and an object of my invention is to provide leverage-applying means for initially obtaining a multiplication of the elevating power for elevating the ejector to release the molded article from its compact with the mold walls, and to subsequently less forcibly and positively, continue the ejecting operation until the molded article is elevated above or from the mold.

Another object of the invention is to provide a power transmission device for transferring power from a driving to a driven pulley, or from a power pulley to an elevating and ejecting mechanism operating pulley, to cause said mechanism to perform an ejecting operation. This friction device comprises a rope belt, attached at one end to the driven pulley and engaged about its periphery, the rope passing from the driven pulley over a driving pulley in direction of its rotation, and downwardly from the opposite side to a point accessible to the operator, who by pulling downwardly upon the rope can cause it to frictionally engage the driving pulley for a limited period to transmittingly connect the driven pulley. This form of transmission does not require great care upon the part of the operator, inasmuch as, when an ejecting operation is completed and the movement of the elevating mechanism has been arrested at its limit, slippage between the driving pulley and belt takes place, although the operator maintains frictional contact between the belt and power pulley.

The improved stripper is applied in a type of mold box, from which the molded article is adapted to be ejected in a vertical direction, and the box has a movable bottom or follower in the form of a pallet translatable within the box for forcing the molded article from the mold.

Other objects and certain advantages will be more fully set forth in the description of the accompanying drawings forming a part of this specification, in which:

Figure 1 is a top plan showing the molding unit including mold box and stripper mechanism therefor.

Figure 2 is an end view of the molding unit.

Figure 3 is a detailed vertical section on line 3—3, Figure 2, illustrating a portion of the stripper or ejector hoisting mechanism.

Figure 4 is a transverse vertical section of the machine taken through the mold box.

Figure 5 is an enlarged detail plan section on line 5—5, Figure 4, illustrating the frames and connections therebetween.

Figure 6 is a vertical section on line 6—6, Figure 1, with the ejector or stripper shown in dot-and-dash lines at its upper limit.

Figure 7 is a perspective view, showing my improved friction transmission device.

Figure 8 is a side view of a modified form of pulley.

The supporting frame of the device comprises a pair of side frame castings 1, 2, stiffened on their outer faces by suitable ribs, and having plane inner surfaces at the upper end, longitudinally of increased length over the lower part of the frame, to provide the ends or sides of the mold box. The frames are connected together in spaced relation by a brace member 3 of skeleton formation to which they are secured by bolts 4. Each frame 1, 2, is provided with a horizontal rib 5, and the ribs are horizontally aligned to form ledges for supporting the removable false bottom or core carrying member 6, which bottom has extending upwardly therefrom the hollow cores 7, 7, in this instance two in number. The bottom 6 as a casting, is of skeleton formation, and simulates a grating, comprising a central longitudinally disposed cross member, and three cross members disposed at right angles to the said central member. The plan outline of this bottom is shown in dotted lines in Figure 1.

The skeleton bottom 6 has suitable stiffening ribs on its lower side, and set screws 8 extend through the walls of the frames 1 and 2 and engage the edges of the bottom at opposite sides to adjust the same transversely between the frames, 1, 2, see Figure 4, to facilitate introduction of screws 9 for securely holding the cores to the sides 10, 11, against translation during an ejecting operation.

To the opposite sides of the bottom 6, are attached exteriorly, ribbed plates 10, 11, forming with the frames 1 and 2 a rectangular mold box, see Figure 6.

The parts are so arranged that substitute bottoms of different dimensions may be attached to correspondingly produce a block of different dimension, in which case the plates 10, 11, must be correspondingly adjusted, and for this purpose the frames 1 and 2 are provided with aligned bolt-receiving openings 15, through any of which, bolts 16 passing through openings in the flanges of plates may be introduced to clamp bottom and plates 10, 11, after adjustment. The length of the block generally remains the same, and therefore, the distance between frames 1 and 2 is generally fixed. This skeleton structure further provides for the passage of stripper rods, which are vertically disposed and translatable for engaging a follower bottom or pallet 20, adapted to be translated from the bottom to the top of the mold, to normally provide a base, while the mold is filled and the cement material tamped, and further functioning as a support for the molded block. This translatable pallet 20, in this instance has openings 22 therein through which the cores 7 extend. Substitute pallets are provided for each molding as the pallets provide a base or support for the block during its driving period. The pallet is suitably ribbed on the underside as at 21 for stiffening purposes, and the stripper or ejector rods engage the bottom at four points for raising the same horizontally without tipping. The pallet 20 is notched as at 23 at opposite sides to give clearance for the ribs 24 bolted vertically to the inner surfaces of the frames 1 and 2, which ribs form correspondingly shaped grooves in the block, serving to merely give shape to the block.

*Stripper mechanism.*

The pallet, and the hereinafter described mechanism for forcibly raising the same within the mold, may be designated the ejector mechanism.

The lower or main part of the ejector mechanism comprises a translatable carriage or elevator member 30. Attached to and extending upward from the member 30 are ejector elements or rods 31, four in number, related as the corners of a rectangle and adapted to engage and translate the pallet. The member 30 is held for vertical sliding movement between pairs of bars 32, a pair attached on the outer side of each frame 1 and 2. The ends of the member 30 are slidably engaged between these respective pairs of guide strips, (as shown in Figure 5). The vertical movements of this ejector are sufficient, in a downward movement to bring the pallet into contact with the top of the bottom of the mold, and in an upward movement to bring the pallet to a position shown in dot-and-dash lines in Figure 6, for conveniently removing the molded block with the pallet as a support from the machine.

Attached to the bottom of the elevator or follower 30, are leverage-applying members, herein designed to be simultaneously operable for initially applying a leverage force for starting the translation of member 30, rods 31 and bottom 20, for loosening the molded article from its compact with the sides or walls of the mold, and for continuing to raise the bottom and molded article to a position in which it can be removed from the box.

This leverage applying means, is attached to the bottom of the member 30, therebeneath and comprises a pair of levers 33 pivoted as at 40, 40, between pairs of ears, integral with and depending from the member 30. The levers are longitudinally aligned and symmetrically disposed at each side of the central vertical axis of the mold and ejector, for applying power evenly to prevent any rocking motion of the member 30 or of the bottom 20. The levers have their short arms adjacently disposed and their long arms extending in opposite directions to a point beyond the frames 1 and 2. A fulcrum for the terminals of the short arms of the levers is provided by a cross plate or truss 42, bolted at opposite ends at the lowermost point of the frames 1 and 2. Thus the leverage applying means occupies little vertical space, and permits the other parts of the ejector mechanism as well as the mold box, to occupy lowest possible levels, for disposing the top of the mold box in position for facilitating the removal of the ejector block.

The means for operating the leverage applying members and forcibly lifting the ejector, comprise the following elements. A driven shaft 60 is mounted horizontally in bearings 61 extending laterally from the side frames 1 and 2, and at opposite ends of this shaft adjacent the side frames are disposed grooved pulleys 62, 62. Chains 63 connect these pulleys with respective projecting ends of the lever members, these connections being shown respectively at 66, 66. The chains run over idler pulleys 67, and then vertically downwardly to the levers. At the outer end of the shaft 60, is a driven pulley 70 connected by a rope belt 71, with the power pulley in a manner herebelow described.

At an intermediate point upon the power shaft and between the pulley 70 and the side of the frame 2, I provide stop and brake means respectively for holding the ejector in its upper position during removal of the molded article, and for limiting the downward movement of the ejector to dispose the levers in a determined position with respect to the fulcrum plate 42. This device comprises a ratchet wheel 73 having two ratchet teeth, providing shoulders 74, 75, engageable with a pin 76, carried by a lever 77 pivoted at one end as at 78 to brackets 79 extending from the rear edge of the frame 2. The lever has a grip portion disposed adjacent the front of the mold box by which it can be raised to withdraw the pin 76 from the shoulders 74, 75. The engagement of the pin with either shoulder is obtained automatically.

When it is desired to raise the ejector from its position shown in Figure 2, power is applied for rotating the shaft 60 in clockwise direction to raise the outer ends of the levers 32 for initially extra forcibly applying power for loosening the molded article from the sides of the mold, and for engaging the long arms of the levers with the under surface of the member 30, for continuing a lifting operation of the ejector until the pallet is freed from the top of the mold as shown in dot-and-dash lines in Figure 6. During the elevation of the ejector mechanism the pin rides upon the periphery of the ratchet wheel until the elevator reaches its upper position at which time the weight of the lever causes the pin to engage the shoulder 75 to prevent reverse motions of the shaft 60 and consequently maintain the elevator at its discharge position. This stopping operation is automatically performed and if the operator does not happen to disconnect the power from the wheel 70, the belt will slip and in this way over-running is positively prevented. When it is desired to lower the elevator and stripping elements, the lever is initially momentarily raised, to disengage the pin from the shoulder 75, and then dropped against the periphery of the wheel for engagement with the shoulder 74 as a stop for limiting downward movement. In Figure 7 I have illustrated a novel friction device for applying power to the shaft 60 through the pulley 70. This friction device provides means for transmitting the power, and for allowing a slippage between a power pulley, and a driven pulley for operating the elevating mechanism, whereby when the mechanism reaches an upper limit, slippage between the power pulley and power transmitting means takes place automatically.

For this purpose I attach one end of a rope 71 to the driven pulley 70 as indicated at 80, and pass the rope about the pulley 70 substantially as shown in Figure 7. The rope is then passed upwardly in this instance, and over a driving pulley 81, in a direction of rotation of the pulley. This driving pulley is mounted upon the driving shaft 82, journaled in any suitable manner. The free end of the rope hangs within the reach of the operator, and when it is desired to apply power for operating the stripper through the shaft 60, the attendant pulls downwardly on the free end of the rope, forcibly frictionally engaging a portion of the rope with the driving pulley, whereby a frictional drive is obtained, and the elevating and ejecting mechanism raised. In this instance the friction continues until the member 30 abuts the underside of the member 3, or bottom of the mold box. This abutting engagement substantially corresponds to the engaging position of the stop shoulder 75, so that the pin 76 will engage the shoulder 75 and hold the elevator in upper position while the molded article is removed. Ordinarily the shoulder will run slightly beyond the pin, and then drop backwardly against the pin.

As the member 30 engages the mold box, or its equivalent, as a stop, slippage between the power pulley and the friction control rope takes place. Thus, by the use of this device power can be conveniently applied, and the mechanism raised to and automatically stopped at its proper upper limit, without great attention on the part of the operator.

The hopper 83 mounted at the mold opening is provided at each side with pairs of flanges 84 overhanging the mold edge for guiding the hopper when it is pushed back and away from the mold opening prior to the ejecting operation.

In Figure 8, a modified form of driven pulley 85 is shown which may be substituted for the driven pulley 70, to relieve the transmission of an excessive starting torque initially in the ejectment of the molded block from the mold. The pulley 25 is of elliptic or eccentric form and specifically is provided with a grooved faced arm 87 providing an extended rope engaging periphery developing into the axially concentric portion of the pulley, furnishing a leverage starting torque to the shaft 60 and a reducing speed increment for a gradual, powerful and smooth starting phase in the transmission.

Having described my invention, I claim:

1. A mold box, a translatable bottom for the box, an ejector member for forcibly translating the bottom, leverage-obtaining means upon said ejector, operable for initially extra forcibly translating the bottom for freeing a molded article from the sides of the mold, and hoisting means connected with said leverage-applying means for operating said leverage means to initially extra forcibly translate the ejector and bottom, and to constitute said leverage-applying means, a lifter, to further translate said ejector member and bottom to their ejecting limit.

2. A frame, a mold box upon the frame, a translatable bottom for said box, an ejector member translatable in the frame and engageable with said bottom for forcibly translating the same, a lever device upon said ejector member engageable with the frame for extra forcibly initially translating the ejector and bottom for freeing a molded article from the side of the mold, and hoisting means attached to said lever device, operable in a single direction both for applying leverage through said lever device, and for causing engagement of said device with the ejector as a lifter for continuing the translation of said ejector member and bottom to their ejecting limits.

3. A mold box, an ejector member translatable in the box for loosening a molded article and translating the same, leverage applying members upon the ejector comprising two opposingly related longitudinally aligned levers symmetrical with the central axis of the mold and ejector, said levers having their short arms adjacently disposed and their long arms extending outwardly in opposite directions, and hoisting means connecting with each lever, for simultaneously operating the levers for initially extra forcibly translating the ejector, to loosen the molded article, and for continuing such translation until said ejector reaches its ejecting limit.

4. A frame, a vertically discharging mold box upon the frame, a bottom translatable in the box, an ejector member translatable in the frame having portions engageable with the translatable bottom for translating the same, leverage applying members upon the ejector comprising two levers longitudinally aligned and symmetrically disposed at right angles to, and at each side of the central axis of the mold and ejector member, said levers having their short arms adjacently disposed with their terminals engaging the frame, and their long arms extending beyond the ejector, and hoisting means connecting with each lever simultaneously operable for rocking the long arms of the lever upwardly for applying leverage with the frame as a fulcrum, to initially extra forcibly translate the ejector, and for bringing the long arms in contact with the bottom of the ejector member, as lifters, for continuing such translation to an ejecting limit.

5. A frame, a vertically discharging mold box upon the frame, a translatable bottom for the box, an elevator member vertically translatable within the frame having symmetrically arranged rods engageable with the outer side of said bottom for translating the same, a pair of symmetrically disposed levers upon and beneath said elevator member having ends engageable with the frame, and adapted for initially extra forcibly translating the elevator and bottom for freeing any molded article from the sides of the mold, and further adapted for engaging beneath the elevator, as lifters, and hoisting means attached to each lever simultaneously operable both for applying leverage by rocking the levers and for causing the levers to act as lifters for continuing the translation of the ejector member and bottom to their ejecting limits.

6. A mold box having a bottom slidable vertically therein, elevating means engaged with the bottom including a shaft having a pulley thereon, a driving pulley, a belt passing over the pulley in direction of rotation and having one end attached to and passing around said shaft pulley with the opposite ends of said belt hanging freely, adapted to be pulled for frictionally engaging the belt against the power pulley to operate said elevating means.

7. A mold box having a bottom slidable therein, elevating means engaged with the bottom including a shaft, means for arresting elevating movement in a predetermined manner, said shaft having a pulley thereon, a driving pulley, a belt passing over the driving pulley in direction of rotation and having an end attached to and passing around said shaft pulley with its opposite end hanging and accessible for pulling to frictionally engage the rope against the power pulley to transmit power to the elevating means, whereby power can be transmitted to said elevating means until the arresting means is operated when slippage between the driving pulley and belt will take place, although the belt remains frictionally engaged with said driving pulley.

8. A mold box, an ejector member translatable therein, leverage applying members upon the ejector, comprising two longitudinally aligned levers pivoted to the ejector, symmetrically disposed with respect to the central axis of mold and ejector, said levers having their short arms adjacently disposed and their long arms projecting outwardly beyond the ejector member, a hoisting shaft, connections between said shaft and levers, for simultaneously pulling upwardly upon the levers to initially extra forcibly translate the ejector to loosen the molded article, and said arms engageable on continued movement with the ejector member, for completing the hoisting and ejecting movement.

9. A frame, a mold box upon the frame having an ejector member vertically moveable therein for discharging the molded article from the box, and lever means upon the bottom of the ejector engageable with the frame for extra forcibly translating the ejector to loosen the article from the sides of the box, said lever means then engageable with the ejector member to qualify as lifters for continuing the ejecting movement.

10. A mold box, a translatable bottom therefor, an ejector member for translating the bottom, lever means upon the ejector operable for initially extra forcibly translating the ejector and bottom for freeing a molded article from the sides of the mold, said lever means further engageable with the ejector, as handles or lifters for the ejector member for completing an ejecting operation.

11. A mold box, a translatable ejector member within the box, leverage applying means upon said ejector member operable for initially extra forcibly translating the member to free a molded article from the sides of the mold, and further operable as lifter means for continuing an ejecting operation, and hoisting means operably connected with said leverage obtaining means.

12. An ejector for molds of the character disclosed comprising a pallet normally providing the base of the mold, elevator means guidingly supported and engaged with the pallet for elevating the pallet through the mold, with the molded product thereon, opposing levers fulcrumed upon said elevator means and arranged to alternately provide a pry and hitch for elevating said means, and transmission means for said elevator means connecting with said levers.

In witness whereof, I hereunto subscribe my name.

NATHAN RANSOHOFF.